(12) United States Patent  (10) Patent No.: US 8,831,345 B2
Toda  (45) Date of Patent: Sep. 9, 2014

(54) IMAGE PROCESSING METHOD, IMAGE PROCESSING APPARATUS, AND IMAGE PROCESSING PROGRAM

(75) Inventor: Masato Toda, Tokyo (JP)

(73) Assignee: NEC Corporation, Tokyo (JP)

( * ) Notice: Subject to any disclaimer, the term of this patent is extended or adjusted under 35 U.S.C. 154(b) by 38 days.

(21) Appl. No.: 13/813,824

(22) PCT Filed: Jul. 29, 2011

(86) PCT No.: PCT/JP2011/067455
§ 371 (c)(1),
(2), (4) Date: Feb. 1, 2013

(87) PCT Pub. No.: WO2012/017946
PCT Pub. Date: Feb. 9, 2012

(65) Prior Publication Data
US 2013/0129214 A1 May 23, 2013

(30) Foreign Application Priority Data
Aug. 4, 2010 (JP) .................................. 2010-175089

(51) Int. Cl.
G06K 9/00 (2006.01)
G06K 9/40 (2006.01)
H04N 9/68 (2006.01)
H04N 5/202 (2006.01)
G06T 11/00 (2006.01)
G06T 5/00 (2006.01)
H04N 1/407 (2006.01)

(52) U.S. Cl.
CPC ..... *G06T 11/001* (2013.01); *G06T 2207/20012* (2013.01); *G06T 5/008* (2013.01); *G06T 2207/20021* (2013.01); *H04N 1/407* (2013.01)
USPC ........... 382/168; 382/167; 382/254; 348/234; 348/254

(58) Field of Classification Search
None
See application file for complete search history.

(56) References Cited

U.S. PATENT DOCUMENTS

| | | | | |
|---|---|---|---|---|
| 5,450,502 A | * | 9/1995 | Eschbach et al. | 382/169 |
| 6,850,642 B1 | * | 2/2005 | Wang | 382/169 |

(Continued)

FOREIGN PATENT DOCUMENTS

| | | |
|---|---|---|
| JP | 2003-256833 A | 9/2003 |
| JP | 2004-221644 A | 8/2004 |

(Continued)

OTHER PUBLICATIONS

International Search Report for PCT/JP2011/067455 dated Aug. 30, 2011.

*Primary Examiner* — Andrae S Allison
(74) *Attorney, Agent, or Firm* — Sughrue Mion, PLLC (57) ABSTRACT

The present invention is an image processing device which has tone mapping curve generation means for local tone correction, which generates a tone mapping curve for local tone correction using the luminance of peripheral areas for each pixel of interest within an input image; prediction means which predicts the overall luminance and/or the contrast of the image after the local tone correction on the basis of the average luminance of partial areas into which the input image has been partitioned; tone mapping curve generation means for global tone correction, which generates a tone mapping curve for global tone correction on the basis of the prediction; and correction means which integrates the tone mapping curve for local tone correction and the tone mapping curve for global tone correction so as to simultaneously execute the local tone correction and the global tone correction.

18 Claims, 5 Drawing Sheets

(56) References Cited

U.S. PATENT DOCUMENTS

| | | | |
|---|---|---|---|
| 7,636,496 B2 * | 12/2009 | Duan et al. | 382/274 |
| 7,822,272 B2 * | 10/2010 | Lei | 382/168 |
| 8,165,393 B2 * | 4/2012 | Lu et al. | 382/166 |
| 8,606,009 B2 * | 12/2013 | Sun | 382/169 |
| 2005/0226526 A1 | 10/2005 | Mitsunaga | |
| 2007/0092137 A1 * | 4/2007 | Zhao et al. | 382/169 |
| 2007/0248282 A1 * | 10/2007 | Suzuki | 382/282 |
| 2007/0268534 A1 * | 11/2007 | Duan et al. | 358/520 |

FOREIGN PATENT DOCUMENTS

| | | |
|---|---|---|
| JP | 2007-243969 A | 9/2007 |
| JP | 2007-310886 A | 11/2007 |
| JP | 2008-227959 A | 9/2008 |
| WO | 2006/025486 A1 | 3/2006 |

* cited by examiner

IMAGE PROCESSING METHOD, IMAGE PROCESSING APPARATUS, AND IMAGE PROCESSING PROGRAM

CROSS REFERENCE TO RELATED APPLICATIONS

This application is a National Stage of International Application No. PCT/JP2011/067455 filed Jul. 29, 2011, claiming priority based on Japanese Patent Application No. 2010-175089 filed Aug. 4, 2010, the contents of all of which are incorporated herein by reference in their entirety.

TECHNICAL FIELD

The present invention relates to an image processing method, an image processing apparatus, and an image processing program.

BACKGROUND ART

To enhance brightness or contrast of backlight or a shaded area present in an image, there have been proposed image processing methods for applying tone remapping based on the average luminance value of a local region in the image. (See PTLs 1 and 2, for example.)

In PTL 1, the amount of correction for a pixel of interest is determined based on the weighted-average luminance value of a local region around the pixel of interest (which luminance value will be referred to as a surrounding luminance value hereinbelow) to correct tone of highlighted and shadowed areas included in an image.

PTL 2 achieves correction by calculating from an input image a degree of backlight of the image, and generating a tone mapping curve from the calculated degree of backlight and a surrounding luminance value for a pixel of interest to correct that pixel.

These PTLs also disclose in their Examples implementations for speeding up the processing in which an input image is equally divided into several rectangular regions, and an average luminance value of each rectangular region is used to determine the amount of correction for a pixel of interest, instead of an implementation involving calculating an average luminance of a local region to determine the amount of correction on a pixel of interest-by-pixel of interest basis.

PTL 1 calculates a surrounding luminance value for a pixel of interest by interpolative processing from an average luminance value of each rectangular region to determine the most appropriate amount of correction.

PTL 2 achieves corrective processing by generating a new tone mapping curve for correcting a pixel of interest by interpolation from tone mapping curves generated according to average luminance values of rectangular regions.

Since these techniques apply correction that is merely suitable to local regions in an image, there is a problem of degraded brightness in the whole corrected image.

For example, to process an image containing strong backlight, it is necessary to store a local correction parameter for applying strong correction in local correction parameter recording means 13 for enhancing visibility of a dark portion or halftone. When such a parameter is used to correct an image containing no backlight, however, the whole image becomes so bright and a low-quality corrected image that looks to be overexposure is output.

To address this problem, PTL 1 discloses an example providing global tone correction for adjusting tone of the whole image again after tone correction on local regions.

Figure 6:
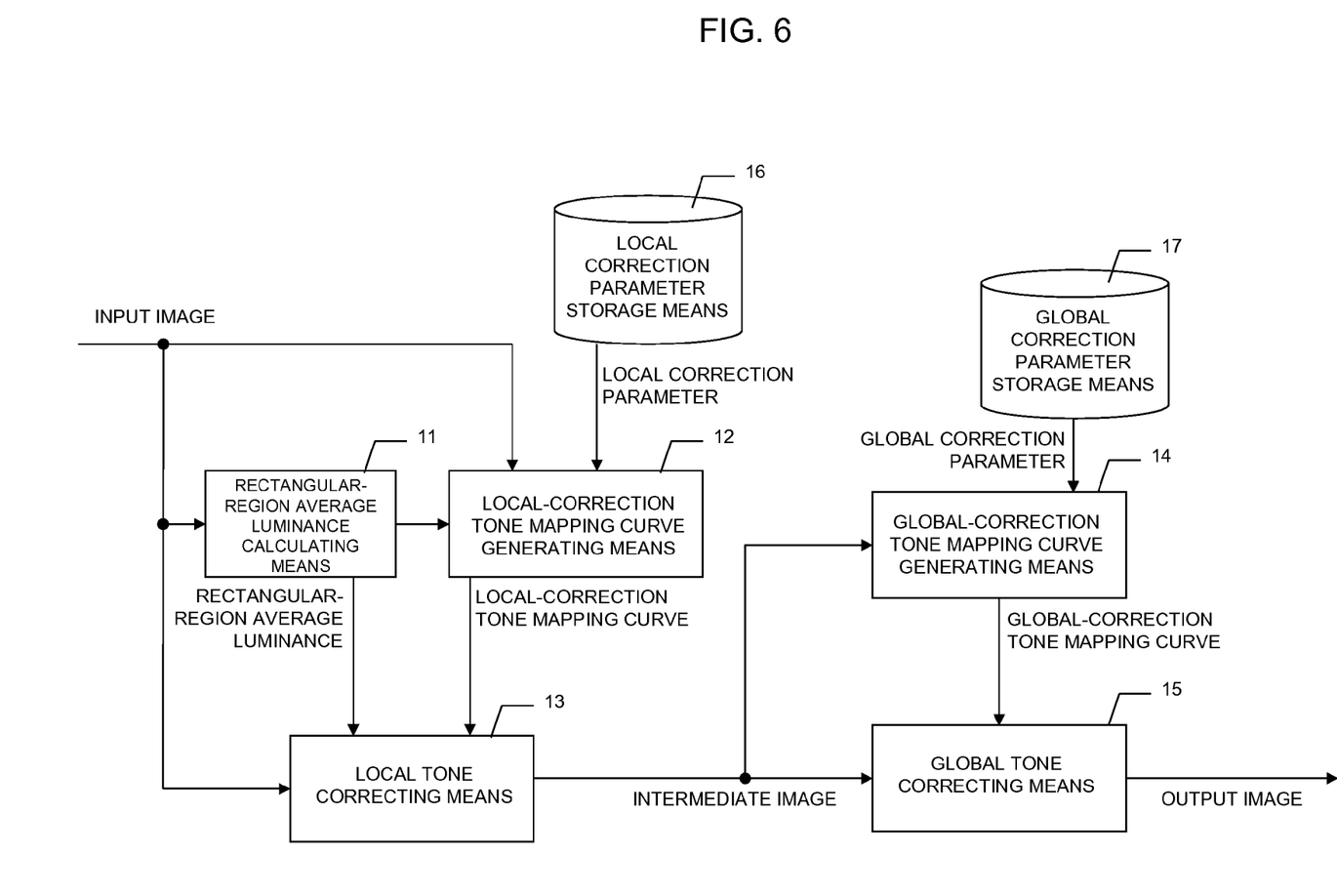
FIG. 6 is a diagram for explaining a related art of the present invention.

Referring to FIG. 6, an image processing apparatus in a related art will be described. FIG. 6 is a block diagram created based on the disclosures in PTLs 1 and 2. The image processing apparatus shown in FIG. 6 is comprised of rectangular-region average luminance calculating means 11, local-correction tone mapping curve generating means 12, local tone correcting means 13, global-correction tone mapping curve generating means 14, global tone correcting means 15, local correction parameter storage means 16, and global correction parameter storage means 17.

The rectangular-region average luminance calculating means 11 calculates an average luminance value of each rectangular region.

The local-correction tone mapping curve generating means 12 generates a local-correction tone mapping curve for applying local-region tone correction to a surrounding luminance value according to a result of analysis on an input image and a parameter loaded from the local correction parameter storage means 16.

The local tone correcting means 13 calculates a surrounding luminance value for a pixel of interest by interpolative processing from the rectangular-region average luminance, corrects the pixel of interest according to the local-correction tone mapping curve corresponding the calculated surrounding luminance value, and produces an intermediate image.

The global-correction tone mapping curve generating means 14 generates a global-correction tone mapping curve for adjusting tone of the whole image according to a result of analysis on the intermediate image and a parameter loaded from a global correction parameter storage means 17.

The global tone correcting means 15 corrects the intermediate image according to the global-correction tone mapping curve, and produces an output image.

CITATION LIST

Patent Literature

PTL 1: WO2006/025486A
PTL 2: JP P2007-243969A

SUMMARY OF INVENTION

Technical Problem

The techniques described above have a problem that to achieve tone correction with high quality, it is necessary to separately conduct corrective processing by the local tone correcting means 13 and that by global tone correcting means 15, which increases the overall processing cost.

Moreover, since it is necessary to retain an intermediate image, which is analyzed for generating a global-correction tone mapping curve, a data memory area of the same size as an input image is additionally required.

Accordingly, the present invention has been made in view of such problems, and its object is to provide an image processing method, an image processing apparatus, and an image processing program in which a required memory size is smaller, a processing load is lower, and tone correction can be conducted with higher quality.

Solution to Problem

The present invention is an image processing method comprising: generating a tone mapping curve for local tone correction by a luminance of a surrounding region of each pixel of interest in an input image; predicting at least one of an overall luminance and contrast of an image after said local tone correction from an average luminance of a partial region defined by dividing said input image; generating a tone mapping curve for global tone correction based on said prediction; and integrating the tone mapping curve for said local tone correction and the tone mapping curve for said global tone correction, and executing said local tone correction and said global tone correction at the same time.

The present invention is an image processing apparatus comprising: tone mapping curve generating means for local tone correction, which generates a tone mapping curve for local tone correction by a luminance of a surrounding region of each pixel of interest in an input image; predicting means for predicting at least one of an overall luminance and contrast of an image after said local tone correction from an average luminance of a partial region defined by dividing said input image; tone mapping curve generating means for global tone correction, which generates a tone mapping curve for global tone correction based on said prediction; and correcting means for integrating the tone mapping curve for said local tone correction and the tone mapping curve for said global tone correction, and executing said local tone correction and said global tone correction at the same time.

The present invention is an image processing program causing an information processing apparatus to execute the processing of: generating a tone mapping curve for local tone correction by a luminance of a surrounding region of each pixel of interest in an input image; predicting at least one of an overall luminance and contrast of an image after said local tone correction from an average luminance of a partial region defined by dividing said input image; generating a tone mapping curve for global tone correction based on said prediction; and integrating the tone mapping curve for said local tone correction and the tone mapping curve for said global tone correction, and executing said local tone correction and said global tone correction at the same time.

Advantageous Effects of Invention

According to the present invention, a required memory size is smaller, a processing load is lower, and tone correction can be conducted with higher quality.

DESCRIPTION OF EMBODIMENTS

Next, the present invention will be described in detail regarding its embodiments with reference to the drawings.

Figure 1:
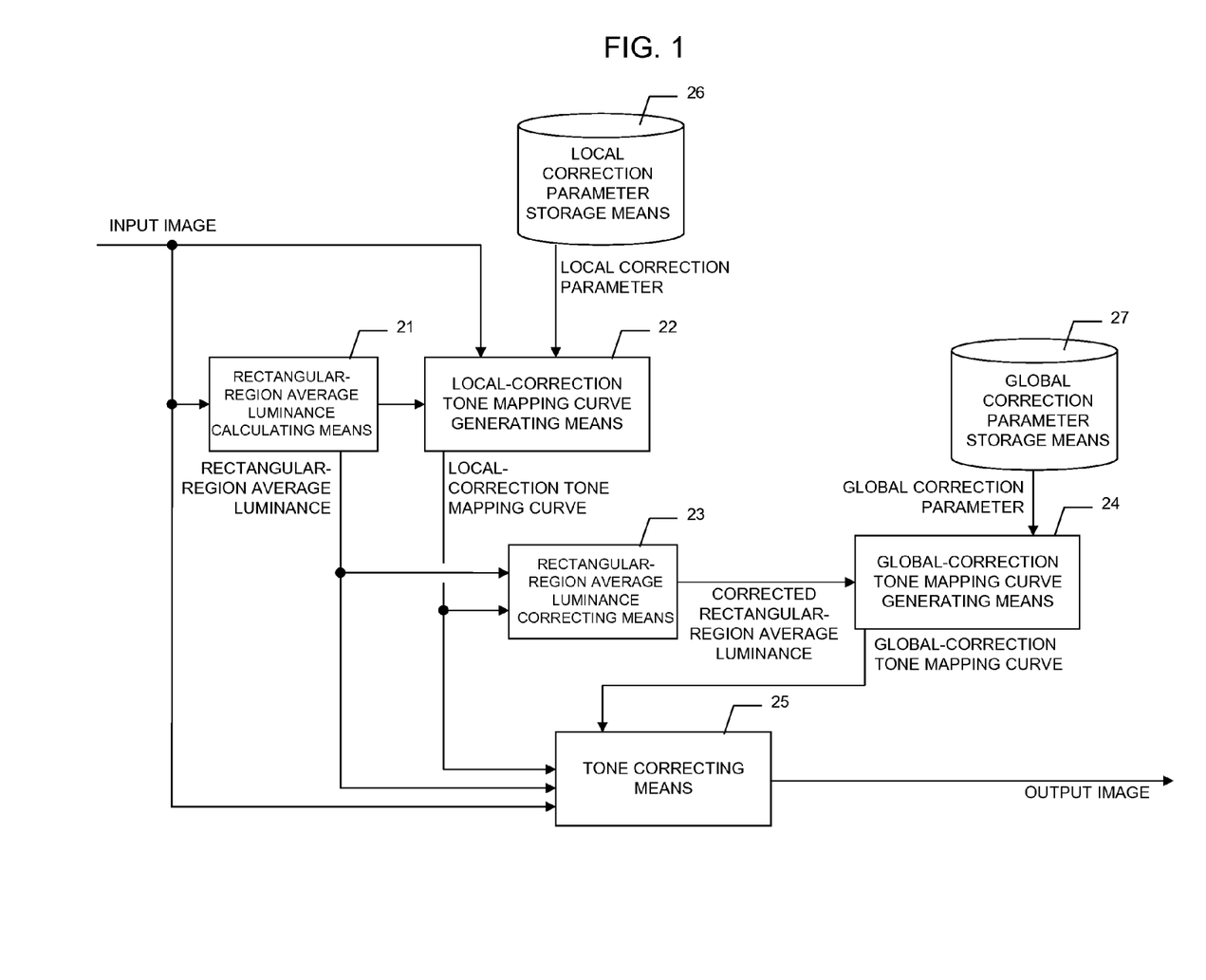
FIG. 1 is a block diagram showing a configuration of an embodiment according to the present invention.

FIG. 1 is a block diagram of a configuration of an embodiment according to the present invention. An image processing apparatus according to the present invention shown in FIG. 1 is comprised of rectangular-region average luminance calculating means 21, local-correction tone mapping curve generating means 22, rectangular-region average luminance correcting means 23, global-correction tone mapping curve generating means 24, tone correcting means 25, local correction parameter storage means 26, and global correction parameter storage means 27.

The embodiment according to the present invention is significantly different from the related art described above in that the present embodiment executes local tone correction and global tone correction at the same time by generating a global-correction tone mapping curve beforehand by correcting a rectangular-region average luminance with a local-correction tone mapping curve and analyzing the corrected rectangular-region average luminance obtained. Operations of these means will now be described in detail.

The rectangular-region average luminance calculating means 21 calculates an average luminance value in each rectangular region, similar to the related art. In a case that an input image is a color image described in an RGB color space, the component representing brightness (Value/Luminescence: the V component in an HSV color space or the L component in an Lab color space; Luminance: the Y component in a YUV color space; or the like) of a pixel of interest is calculated by color conversion, and the resulting value is used as a luminance value to calculate an average luminance value. In a case that the input image is a color image described in a YUV color space, an HSV color space or the like, the value of the component representing a brightness of a color called luminance component, luminescence component or the like is used as the luminance value to calculate an average luminance value.

The local-correction tone mapping curve generating means 22 generates a local-correction tone mapping curve for applying local-region tone correction to a surrounding luminance value according to a result of analysis on the input image and a parameter loaded from the local correction parameter storage means 26, similar to the related art. It should be noted that the output of the local-correction tone mapping curve generating means 22 may be a parameter representing the shape of a tone mapping curve, instead of the tone mapping curve. In a case that the local-correction tone mapping curve is a gamma correction curve, for example, it is possible to output a gamma value for each surrounding luminance value, rather than output a gamma correction curve for each surrounding luminance value.

The rectangular-region average luminance correcting means 23 corrects the rectangular-region average luminance by the local-correction tone mapping curve, and calculates a corrected rectangular-region average luminance that represents a predictive value for the average luminance after the local tone correction in each rectangular region.

One exemplary method of calculating a corrected rectangular-region average luminance may comprise calculating a luminance by local corrective processing in which a rectangular-region average luminance is assigned to a value of a pixel of interest and to a surrounding luminance value. In this method, a corrected rectangular-region average luminance value $S_0(i)$ in an i-th rectangular region is calculated by selecting a local-correction tone mapping curve having an input rectangular-region average luminance value $S(i)$ as a surrounding luminance value, and reading an output value corresponding to $S(i)$ in the selected tone mapping curve. Alternatively, in a case that the local-correction tone mapping curve is a gamma correction curve, the corrected rectangular-region average luminance value $S_0(i)$ is calculated using a gamma value $\gamma(S(i))$ corresponding to $S(i)$ according to EQ. 1 as follows:

[Equation 1]

$$So(i) = M\left(\frac{S(i)}{M}\right)^{\gamma(S(i))} \quad (EQ.\ 1)$$

where M denotes a maximum that the rectangular-region average luminance value may take.

Alternatively, another method of calculating the corrected rectangular-region average luminance value may be used, the method comprising retaining beforehand the value of a corrected rectangular-region average luminance for a rectangular-region average luminance as data, and reading a corresponding calculated value during calculation from among the data.

The global-correction tone mapping curve generating means 24 generates a global-correction tone mapping curve for adjusting tone of the whole image according to an analysis value of the corrected rectangular-region average luminance and a parameter loaded from the global correction parameter storage means 26.

A method of generating a global-correction tone mapping curve may comprise calculating a predictive value for the average luminance of the whole image after local tone correction as an analysis value for a corrected rectangular-region average luminance, and generating a tone mapping curve for converting the value into a target average luminance value P for an output image, which target value is retained in the global correction parameter storage means 27 as a parameter.

A method of calculating a predictive value for the average luminance of the whole image after local tone correction may comprise calculating a predictive value for an average of the rectangular-region average luminance. In this method, representing the total number of divided rectangular regions as N, a predictive value E is calculated according to EQ. 2 as follows:

[Equation 2]

$$E = \sum_{i=0}^{N-1} \frac{So(i)}{N} \quad (EQ.\ 2)$$

Alternatively, another method may be used, the method comprising using a median of the corrected rectangular-region average luminance as the predictive value.

One method of generating a tone mapping curve for converting a predictive value E into a target average luminance value P may comprise generating a gamma correction curve for implementing these conversion. A gamma value $\gamma(E, P)$ for converting a predicted image luminance E into a target average luminance value P can be calculated according to EQ. 3 as follows:

[Equation 3]

$$\gamma(E, P) = \frac{\ln M - \ln P}{\ln M - \ln E} \quad (EQ.\ 3)$$

Figure 3:
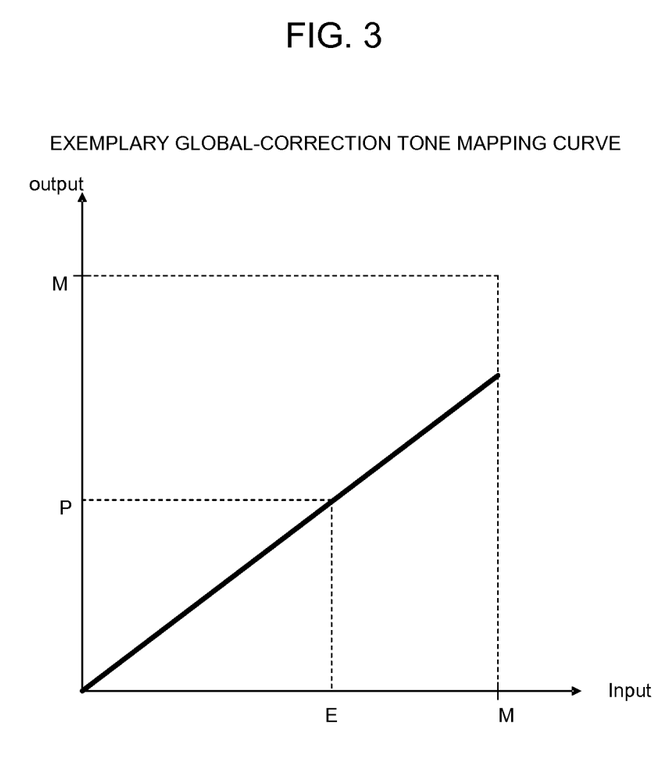
FIG. 3 is a diagram showing an exemplary global-correction tone mapping curve.

Another global-correction tone mapping curve for converting a predicted image luminance E into a target average luminance value P may be used, such as a linear tone mapping curve as shown in FIG. 3.

Figure 4:
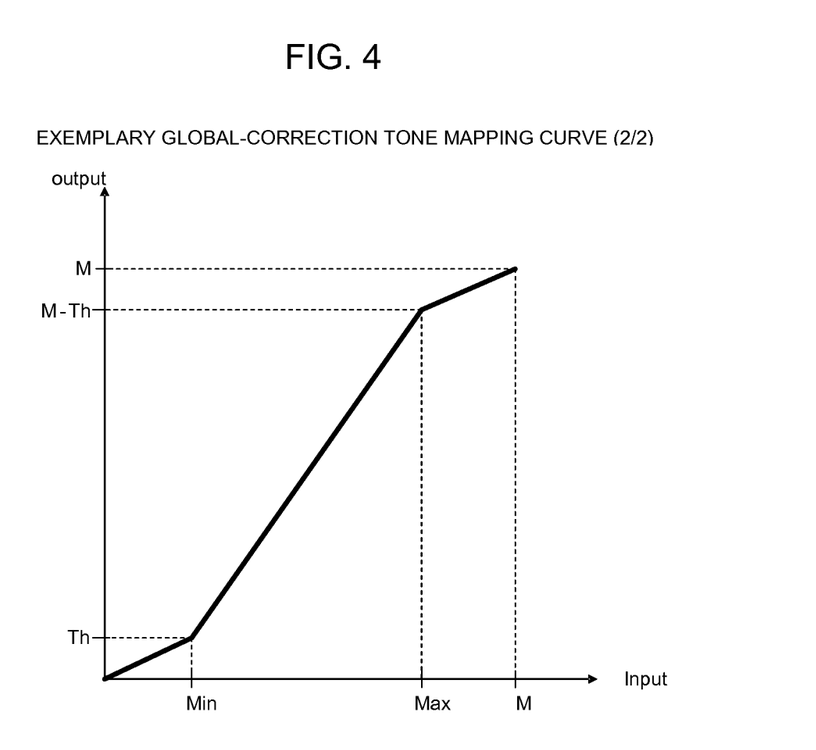
FIG. 4 is a diagram showing an exemplary global-correction tone mapping curve.

Another method of generating a global-correction tone mapping curve may comprise using a maximum and a minimum of the corrected rectangular-region average luminance as an analysis value of the corrected rectangular-region average luminance to generate a tone mapping curve as shown in FIG. 4. In the tone mapping curve in FIG. 4, the symbols Max and Min denote the maximum and minimum of the corrected rectangular-region average luminance, and Th denotes a parameter value retained in the global correction parameter storage means 27.

It should be noted that the output of the global-correction tone mapping curve generating means 24 may be a parameter representing the shape of the tone mapping curve, rather than the tone mapping curve, similar to the output of the local-correction tone mapping curve generating means 22.

The tone correcting means 25 applies tone correction using the local-correction tone mapping curve and tone correction using the global-correction tone mapping curve to each pixel in the input image, and produces an output image.

For example, tone correction on a certain pixel of interest is executed as follows: First, a surrounding luminance value for the position of the pixel of interest is calculated by interpolative processing from a rectangular-region average luminance. Next, a corresponding local-correction tone mapping curve is selected from the calculated surrounding luminance value, and local tone correction is executed. Finally, correction by a global-correction tone mapping curve is conducted to generate an output pixel.

In a case that an input image is a color image described in an RGB color space, tone correction processing is applied to each color channel. In a case that the input image is a color space described in a YUV color space, HSV color space or the like, the tone correction processing is applied only to the component called luminance component or luminescence component that represents a brightness of a color.

Alternatively, the tone correction processing at the tone correcting means 25 may generate a new tone mapping curve by combining the local-correction tone mapping curve with the global-correction tone mapping curve before executing the corrective processing, and execute the tone correction processing using the generated combined tone mapping curve. At that time, since the tone correction processing on each pixel is executed with one step of referring to a tone mapping curve, the processing is sped up as a whole as compared with correction with steps of referring to individual tone mapping curves.

Figure 2:
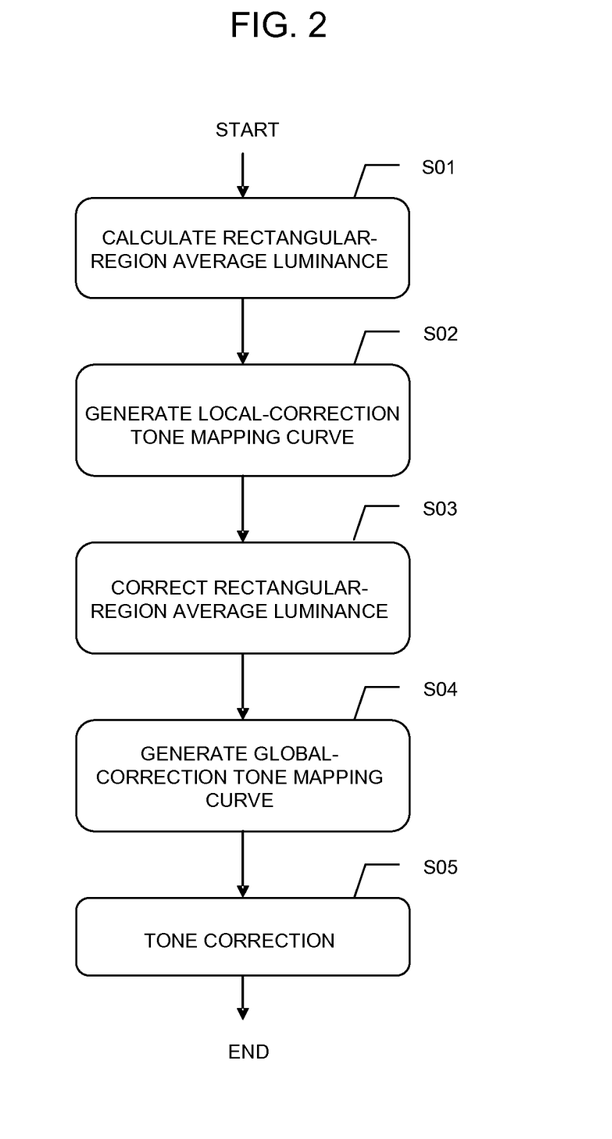
FIG. 2 is a flow chart showing an operation in an embodiment according to the present invention.

Next, the whole operation of the present embodiment will be described with reference to FIG. 1 and the flow chart in FIG. 2.

The rectangular-region luminance calculating means 21 calculates an average luminance value in each rectangular region (S01).

The local-correction tone mapping curve generating means 22 generates a local-correction tone mapping curve for applying tone correction in a local region (S02).

The rectangular-region average luminance correcting means 23 calculates a corrected rectangular-region average luminance that represents a predictive value for the average luminance after the local tone correction in each rectangular region (S03).

The global-correction tone mapping curve generating means 24 generates a global-correction tone mapping curve for adjusting tone of the whole image (S04).

The tone correcting means 25 applies tone correction to each pixel in the input image, and produces an output image (S05).

As above, according to the present embodiment, the required memory size may be reduced, and tone of backlight or a shaded area in an image can be corrected with high quality and low processing load. A reason thereof is that local tone correction and global tone correction are executed at the same time by estimating a rectangular-region average luminance of a locally tone-corrected image beforehand and generating a global-correction tone mapping curve.

While the embodiments of the invention described above may be constructed in hardware, they may be implemented by a computer program, as obvious from the preceding description.

Figure 5:
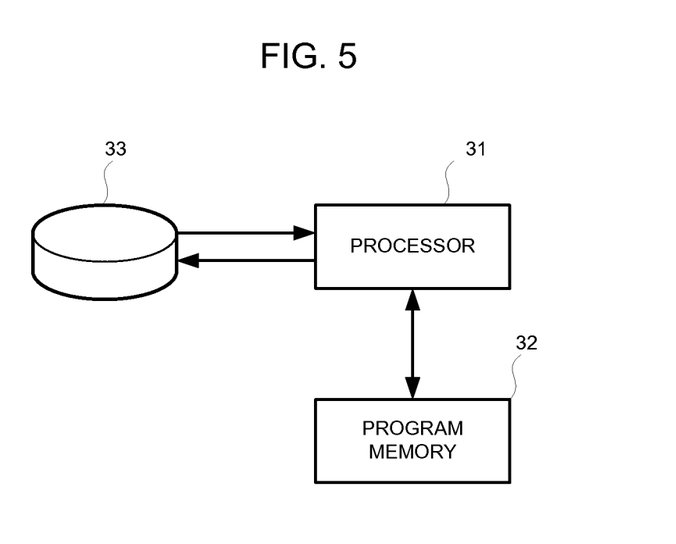
FIG. 5 is a block diagram of an information processing system in an embodiment according to the present invention.

An information processing system shown in FIG. 5 consists of a processor 31, a program memory 32, and a storage medium 33. The storage medium 33 functions as the local correction parameter storage means 26 and global correction parameter storage means 27. For the storage medium 33, magnetic storage media, such as a hard disk, or a nonvolatile memory and the like may be employed.

The program memory 32 stores therein programs performing processing similar to the rectangular-region average luminance calculating means 21, local-correction tone mapping curve generating means 22, rectangular-region average luminance correcting means 23, global-correction tone mapping curve generating means 24, and tone correcting means 25, and the processor 31 loads the programs to execute similar processing.

Further, the content of the above-mentioned exemplary embodiments can be expressed as follows.

(Supplementary note 1) An image processing method comprising:

generating a tone mapping curve for local tone correction by a luminance of a surrounding region of each pixel of interest in an input image;

predicting at least one of an overall luminance and contrast of an image after said local tone correction from an average luminance of a partial region defined by dividing said input image;

generating a tone mapping curve for global tone correction based on said prediction; and integrating the tone mapping curve for said local tone correction and the tone mapping curve for said global tone correction, and executing said local tone correction and said global tone correction at the same time.

(Supplementary note 2) The image processing method according to Supplementary note 1, comprising calculating a luminance of a surrounding region of each pixel of interest from an average luminance of each partial region defined by dividing an input image.

(Supplementary note 3) The image processing method according to Supplementary note 1 or Supplementary note 2, comprising calculating a predictive value for an average luminance of each partial region after local tone correction by correcting an average luminance of each partial region defined by dividing said input image with local tone correction in which a value of said average luminance is assigned to said surrounding region.

(Supplementary note 4) The image processing method according to Supplementary note 3, comprising calculating a predictive value for an overall luminance of an image after said local tone correction by taking an average of average luminance values of partial regions after said local tone correction.

(Supplementary note 5) The image processing method according to Supplementary note 3, comprising calculating an overall contrast of an image after said local tone correction from a maximum and a minimum of predictive values for average luminance values of partial regions after said local tone correction.

(Supplementary note 6) The image processing method according to any one of Supplementary note 1 to Supplementary note 5, wherein at least one of tone mapping curves for said local tone correction and said global tone correction is a gamma correction curve.

(Supplementary note 7) An image processing apparatus comprising:

tone mapping curve generating means for local tone correction, which generates a tone mapping curve for local tone correction by a luminance of a surrounding region of each pixel of interest in an input image;

predicting means for predicting at least one of an overall luminance and contrast of an image after said local tone correction from an average luminance of a partial region defined by dividing said input image;

tone mapping curve generating means for global tone correction, which generates a tone mapping curve for global tone correction based on said prediction; and correcting means for integrating the tone mapping curve for said local tone correction and the tone mapping curve for said global tone correction, and executing said local tone correction and said global tone correction at the same time.

(Supplementary note 8) The image processing apparatus according to Supplementary note 7, wherein said tone mapping curve generating means for local tone correction calculates a luminance of a surrounding region of each pixel of interest from an average luminance of each partial region defined by dividing an input image.

(Supplementary note 9) The image processing apparatus according to Supplementary note 7 or Supplementary note 8, wherein said predicting means calculates a predictive value for an average luminance of each partial region after local tone correction by correcting an average luminance of each partial region defined by dividing said input image with local tone correction in which a value of said average luminance is assigned to said surrounding region.

(Supplementary note 10) The image processing apparatus according to Supplementary note 9, wherein said predicting means calculates a predictive value for an overall luminance of an image after said local tone correction by taking an average of average luminance values of partial regions after said local tone correction.

(Supplementary note 11) The image processing apparatus according to Supplementary note 9, wherein said predicting means calculates an overall contrast of an image after said local tone correction from a maximum and a minimum of predictive values for average luminance values of partial regions after said local tone correction.

(Supplementary note 12) The image processing apparatus according to any one of Supplementary note 7 to Supplementary note 10, wherein at least one of tone mapping curves for said local tone correction and said global tone correction is a gamma correction curve.

(Supplementary note 13) An image processing program causing an information processing apparatus to execute the processing of:

generating a tone mapping curve for local tone correction by a luminance of a surrounding region of each pixel of interest in an input image;

predicting at least one of an overall luminance and contrast of an image after said local tone correction from an average luminance of a partial region defined by dividing said input image;

generating a tone mapping curve for global tone correction based on said prediction; and integrating the tone mapping curve for said local tone correction and the tone mapping curve for said global tone correction, and executing said local tone correction and said global tone correction at the same time.

Above, although the present invention has been particularly described with reference to the preferred embodiments and examples, it should be readily apparent to those of ordinary skill in the art that the present invention is not always limited to the above-mentioned embodiments and examples, and changes and modifications in the form and details may be made without departing from the spirit and scope of the invention.

This application is based upon and claims the benefit of priority from Japanese patent application No. 2010-175089, filed on Aug. 4, 2010, the disclosure of which is incorporated herein in its entirety by reference.

INDUSTRIAL APPLICABILITY

The present invention is applicable to image processing apparatuses that automatically correct tone of backlight or a shaded area in an image.

REFERENCE SIGNS LIST

21 Rectangular-region average luminance calculating means
22 Local-correction tone mapping curve generating means
23 Rectangular-region average luminance correcting means
24 Global-correction tone mapping curve generating means
25 Tone correcting means
26 Local correction parameter storage means
27 Global correction parameter storage means

The invention claimed is:

1. An image processing method comprising:
generating a tone mapping curve for local tone correction by a luminance of a surrounding region of each pixel of interest in an input image;
predicting at least one of an overall luminance and contrast of an image after said local tone correction from an average luminance of a partial region defined by dividing said input image;
generating a tone mapping curve for global tone correction based on said prediction; and
integrating the tone mapping curve for said local tone correction and the tone mapping curve for said global tone correction, and executing said local tone correction and said global tone correction at the same time.

2. The image processing method according to claim 1, comprising
calculating a luminance of a surrounding region of each pixel of interest from an average luminance of each partial region defined by dividing an input image.

3. The image processing method according to claim 1, comprising
calculating a predictive value for an average luminance of each partial region after local tone correction by correcting an average luminance of each partial region defined by dividing said input image with local tone correction in which a value of said average luminance is assigned to said surrounding region.

4. The image processing method according to claim 3, comprising
calculating a predictive value for an overall luminance of an image after said local tone correction by taking an average of average luminance values of partial regions after said local tone correction.

5. The image processing method according to claim 3, comprising
calculating an overall contrast of an image after said local tone correction from a maximum and a minimum of predictive values for average luminance values of partial regions after said local tone correction.

6. The image processing method according to claim 1, wherein
at least one of tone mapping curves for said local tone correction and said global tone correction is a gamma correction curve.

7. An image processing apparatus comprising:
tone mapping curve generator for local tone correction, which generates a tone mapping curve for local tone correction by a luminance of a surrounding region of each pixel of interest in an input image;
predicting unit that predicts at least one of an overall luminance and contrast of an image after said local tone correction from an average luminance of a partial region defined by dividing said input image;
tone mapping curve generator for global tone correction, which generates a tone mapping curve for global tone correction based on said prediction; and
correcting unit that integrates the tone mapping curve for said local tone correction and the tone mapping curve for said global tone correction, and executes said local tone correction and said global tone correction at the same time.

8. The image processing apparatus according to claim 7, wherein said tone mapping curve generator for local tone correction calculates a luminance of a surrounding region of each pixel of interest from an average luminance of each partial region defined by dividing an input image.

9. The image processing apparatus according to claim 7, wherein said predicting unit calculates a predictive value for an average luminance of each partial region after local tone correction by correcting an average luminance of each partial region defined by dividing said input image with local tone correction in which a value of said average luminance is assigned to said surrounding region.

10. The image processing apparatus according to claim 9, wherein said predicting unit calculates a predictive value for an overall luminance of an image after said local tone correction by taking an average of average luminance values of partial regions after said local tone correction.

11. The image processing apparatus according to claim 9, wherein said predicting unit calculates an overall contrast of an image after said local tone correction from a maximum and a minimum of predictive values for average luminance values of partial regions after said local tone correction.

12. The image processing apparatus according to claim 7, wherein
at least one of tone mapping curves for said local tone correction and said global tone correction is a gamma correction curve.

13. A non-transitory computer readable storage medium storing an image processing program causing an information processing apparatus to execute the processing of:

generating a tone mapping curve for local tone correction by a luminance of a surrounding region of each pixel of interest in an input image;

predicting at least one of an overall luminance and contrast of an image after said local tone correction from an average luminance of a partial region defined by dividing said input image;

generating a tone mapping curve for global tone correction based on said prediction; and integrating the tone mapping curve for said local tone correction and the tone mapping curve for said global tone correction, and executing said local tone correction and said global tone correction at the same time.

14. The non-transitory computer readable storage medium storing an image processing program according to claim 13, wherein said tone mapping curve generating process for local tone correction calculates a luminance of a surrounding region of each pixel of interest from an average luminance of each partial region defined by dividing an input image.

15. The non-transitory computer readable storage medium storing an image processing program according to claim 13, wherein said predicting process calculates a predictive value for an average luminance of each partial region after local tone correction by correcting an average luminance of each partial region defined by dividing said input image with local tone correction in which a value of said average luminance is assigned to said surrounding region.

16. The non-transitory computer readable storage medium storing an image processing program according to claim 15, wherein said predicting process calculates a predictive value for an overall luminance of an image after said local tone correction by taking an average of average luminance values of partial regions after said local tone correction.

17. The non-transitory computer readable storage medium storing an image processing program according to claim 15, wherein said predicting process calculates an overall contrast of an image after said local tone correction from a maximum and a minimum of predictive values for average luminance values of partial regions after said local tone correction.

18. The non-transitory computer readable storage medium storing an image processing program according to claim 13, wherein at least one of tone mapping curves for said local tone correction and said global tone correction is a gamma correction curve.

* * * * *